US012755565B2

(12) United States Patent
Chang et al.

(10) Patent No.: US 12,755,565 B2
(45) Date of Patent: Oct. 6, 2026

(54) CALIBRATING SYSTEM, CALIBRATING METHOD AND NON-TRANSITORY COMPUTER READABLE STORAGE MEDIUM THEREOF FOR CALIBRATING PREDICTED LINE-OF-SIGHT

(71) Applicant: LITE-ON TECHNOLOGY CORPORATION, Taipei (TW)

(72) Inventors: Hao-Min Chang, Taipei (TW); Chih-Yuan Chuang, Taipei (TW); Yan-Ting Liu, Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 19/201,974

(22) Filed: May 8, 2025

(65) Prior Publication Data

US 2026/0065695 A1 Mar. 5, 2026

Related U.S. Application Data

(60) Provisional application No. 63/687,784, filed on Aug. 28, 2024.

(30) Foreign Application Priority Data

Mar. 11, 2025 (CN) ......................... 202510285405.2

(51) Int. Cl.
*G06V 20/59* (2022.01)
*G06F 3/01* (2006.01)
*G06T 7/70* (2017.01)

(52) U.S. Cl.
CPC ............ *G06V 20/597* (2022.01); *G06F 3/013* (2013.01); *G06T 7/70* (2017.01)

(58) Field of Classification Search
CPC ........ B60W 50/0097; B60W 2540/225; G06V 20/597; G06V 40/18; G06V 40/19;
(Continued)

(56) References Cited

U.S. PATENT DOCUMENTS

| | | | | |
|---|---|---|---|---|
| 2019/0147607 A1* | 5/2019 | Stent | ...................... | H04N 23/63 382/103 |
| 2022/0300072 A1* | 9/2022 | Arar | .................... | G06F 18/2148 |

FOREIGN PATENT DOCUMENTS

| | | |
|---|---|---|
| CN | 102520796 A | 6/2012 |
| CN | 110569750 A | 12/2019 |

(Continued)

OTHER PUBLICATIONS

Office Action issued by Taiwan Intellectual Property Office on Nov. 21, 2025.

*Primary Examiner* — John W Miller
*Assistant Examiner* — Humam M Satti
(74) *Attorney, Agent, or Firm* — WPAT, PC

(57) ABSTRACT

A calibrating system is provided, and a reference result calculating device of the calibrating system generates an eye position and a reference line-of-sight angle at each historical time point. Furthermore, a filtering processing device performs filtering process on a first predicted line-of-sight angle generated by a line-of-sight predicting device according to a first image of the eye, so as to obtain a second predicted line-of-sight angle at the historical time points. e. A compensation value calculating device obtains a bias value according to the second predicted line-of-sight angle and the reference line-of-sight angle. A configuration managing device updates the second predicted line-of-sight angles and bias values in a configuration file. A line-of-sight correcting device calculates an average bias value of the second predicted line-of-sight angle according to the configuration file,
(Continued)

and compensates a future predicted line-of-sight angle according to the average bias value.

21 Claims, 15 Drawing Sheets

(58) Field of Classification Search
CPC .... G06V 40/193; G06V 40/197; G06V 10/82; H04N 13/383; H04N 13/366; G06N 3/08; G06F 3/013; G06F 18/214; G06T 2207/20084; G06T 2207/20081; G06T 7/70
See application file for complete search history.

(56) References Cited

FOREIGN PATENT DOCUMENTS

| | | | | | |
|---|---|---|---|---|---|
| CN | 113661495 | A | | 11/2021 | |
| CN | 113808160 | A | * | 12/2021 | ............. G01S 17/89 |
| CN | 114868102 | A | | 8/2022 | |
| CN | 117809355 | A | * | 4/2024 | ........... G06V 10/774 |

* cited by examiner

CALIBRATING SYSTEM, CALIBRATING METHOD AND NON-TRANSITORY COMPUTER READABLE STORAGE MEDIUM THEREOF FOR CALIBRATING PREDICTED LINE-OF-SIGHT

This application claims the benefits of U.S. provisional application Ser. No. 63/687,784, filed Aug. 28, 2024 and CN application No. 202510285405.2, filed Mar. 11, 2025, the disclosures of which are incorporated by reference herein in entirety.

TECHNICAL FIELD

The present disclosure relates to a calibrating mechanism, and particularly relates to a calibrating system and a calibrating method for calibrating a predicted line-of-sight.

BACKGROUND

Various emerging types of vehicles (such as electric vehicles) are usually equipped with assisted driving systems, which use artificial intelligence to perform calculations and provide various types of driving assistance to vehicle drivers. The assisted driving system may include a line-of-sight predicting device, which is used to predict or estimate a direction of a line-of-sight of the driver, thereby evaluating a attention level of the driver and determining whether the driver is in a dangerous driving state. When a dangerous driving state is determined, the assisted driving system can generate a warning signal to remind the driver, or activate an automatic assisted driving function.

In order to ensure driving safety, the line-of-sight predicting device of the assisted driving system must achieve a higher accuracy for prediction. However, among different drivers, their respective eye visual systems may have different individual physiological characteristics, which may lead to errors in predicted results of the line-of-sight predicting device. In addition, uncertainties in the vehicle's surrounding environment may also have a negative impact on the accuracy for prediction of the line-of-sight predicting device.

In view of the above issues, it is necessary to provide an effective calibrating system, which can calibrate errors of the line-of-sight predicting device in the assisted driving system, so as to improve the prediction accuracy for predicting the direction of line-of-sight of the driver, and thereby improve the driving safety.

SUMMARY

According to one embodiment of the present disclosure, a calibrating system is provided. The calibrating system includes the following elements. A reference result calculating device, is for generating an eye position of an eye of a user at each of a plurality of historical time points, and obtaining a reference line-of-sight angle according to the eye position and a target position associated with a target object at each of the historical time points, wherein the eye is a left eye or a right eye of the user, the user is located inside a vehicle, and the target object is located outside the vehicle. A filtering processing device, is for performing a filtering process on a plurality of first predicted line-of-sight angles generated by a line-of-sight predicting device at the historical time points, so as to obtain a second predicted line-of-sight angle at each of the historical time points, wherein the first predicted line-of-sight angles are obtained by the line-of-sight predicting device through a coarse prediction based on a plurality of first images associated with the eye. A compensation value calculating device, is for obtaining a plurality of offset values according to the second predicted line-of-sight angles and the reference line-of-sight angles at the historical time points. A configuration managing device, is for updating the second predicted line-of-sight angles and the offset values at the historical time points in a configuration file. A line-of-sight calibrating device, is for calculating an average offset value of the second predicted line-of-sight angles according to the configuration file, and compensating a future predicted line-of-sight angle according to the average offset value.

According to another embodiment of the present disclosure, a calibrating method is provided. The calibrating method includes the following steps. Generating an eye position of an eye of a user at each of a plurality of historical time points, and obtaining a reference line-of-sight angle according to the eye position and a target position associated with a target object at each of the historical time points, wherein the eye is a left eye or a right eye of the user, the user is located inside a vehicle, and the target object is located outside the vehicle, by a reference result calculating device. Performing a filtering process on a plurality of first predicted line-of-sight angles generated by a line-of-sight predicting device at the historical time points, so as to obtain a second predicted line-of-sight angle at each of the historical time points, wherein the first predicted line-of-sight angles are obtained by the line-of-sight predicting device through a coarse prediction based on a plurality of first images associated with the eye, by a filtering processing device. Obtaining a plurality of offset values according to the second predicted line-of-sight angles and the reference line-of-sight angles at the historical time points, by a compensation value calculating device. Updating the second predicted line-of-sight angles and the offset values at the historical time points in a configuration file, by a configuration managing device. Calculating an average offset value of the second predicted line-of-sight angles according to the configuration file, and compensating a future predicted line-of-sight angle according to the average offset value, by a line-of-sight calibrating device.

Figure 1:
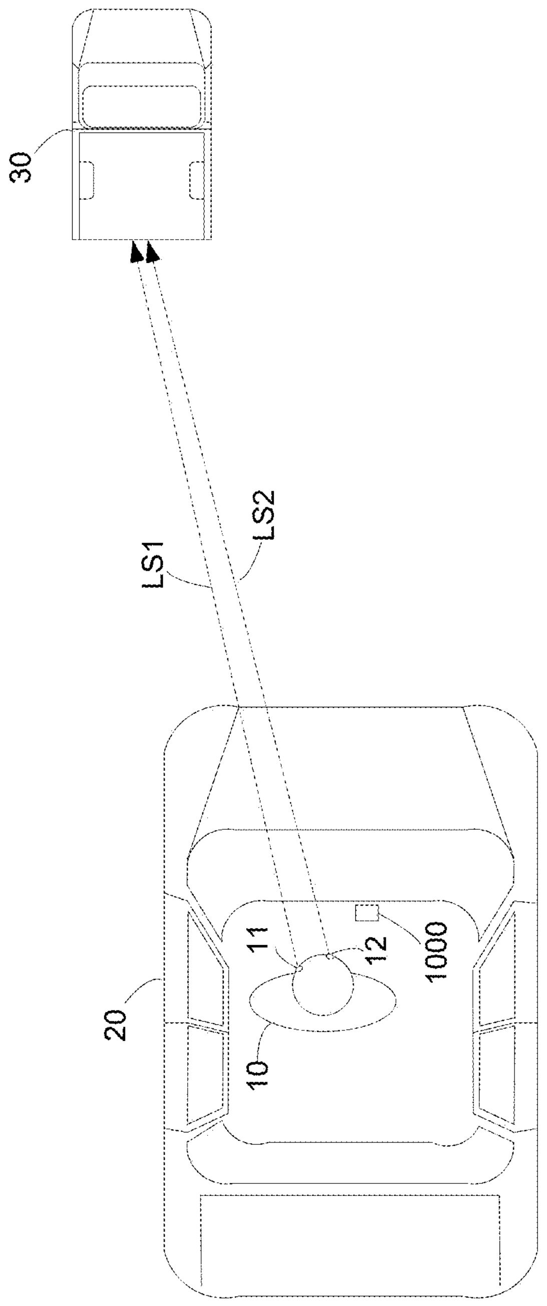
FIG. 1 is a schematic diagram of an application environment of a calibrating system according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

FIG. 1 is a schematic diagram of an application environment of a calibrating system 1000 according to an embodiment of the present disclosure. The calibrating system 1000 is disposed on a vehicle 20. The vehicle 20 is driven by a user 10. The vehicle 20 is, for example, a vehicle of one of various forms, including a four-wheeled car, a cargo truck, and a public transportation bus, etc. Alternatively, the vehicle 20 is one of various forms of aircrafts or ships, including a helicopter, a small private jet, a large public transport plane, a yacht, and a cargo ship, etc. In the following embodiments, a four-wheeled car is taken as an exemplary description for the vehicle 20.

The calibrating system 1000 is used to calibrate a line-of-sight of the user 10. The user 10 is a driver of the vehicle 20, and the user 10 sits inside the vehicle 20. The user 10 can view a target object 30 outside the vehicle 20 from the inside of the vehicle 20. The target object 30 may be fixed or mobile, such as other vehicles, pedestrians, buildings, traffic sign facilities around the vehicle 20. In this embodiment, the target object 30 is another vehicle in front of the left side of the vehicle 20. More specifically, when the user 10 gazes at the target object 30, one the eyes of the user 10 may focus on the target object 30 according to a direction of the line-of-sight. This one of eyes of the user 10 may be a left eye 11 or a right eye 12. For example, the left eye 11 of the user 10 gazes at the target object 30 according to the direction of the line-of-sight LS1, and the right eye 12 gazes at the target object 30 according to the direction of the line-of-sight LS2. The calibrating system 1000 calibrates the line-of-sight LS1 of the left eye 11 and the line-of-sight LS2 of the right eye 12 of the user 10 respectively. The following embodiments take the calibration of the line-of-sight LS1 of the left eye 11 as an exemplary description (the technical solutions of the following embodiments can also be applied to the calibration of the line-of-sight LS2 of the right eye 12).

Figure 2:
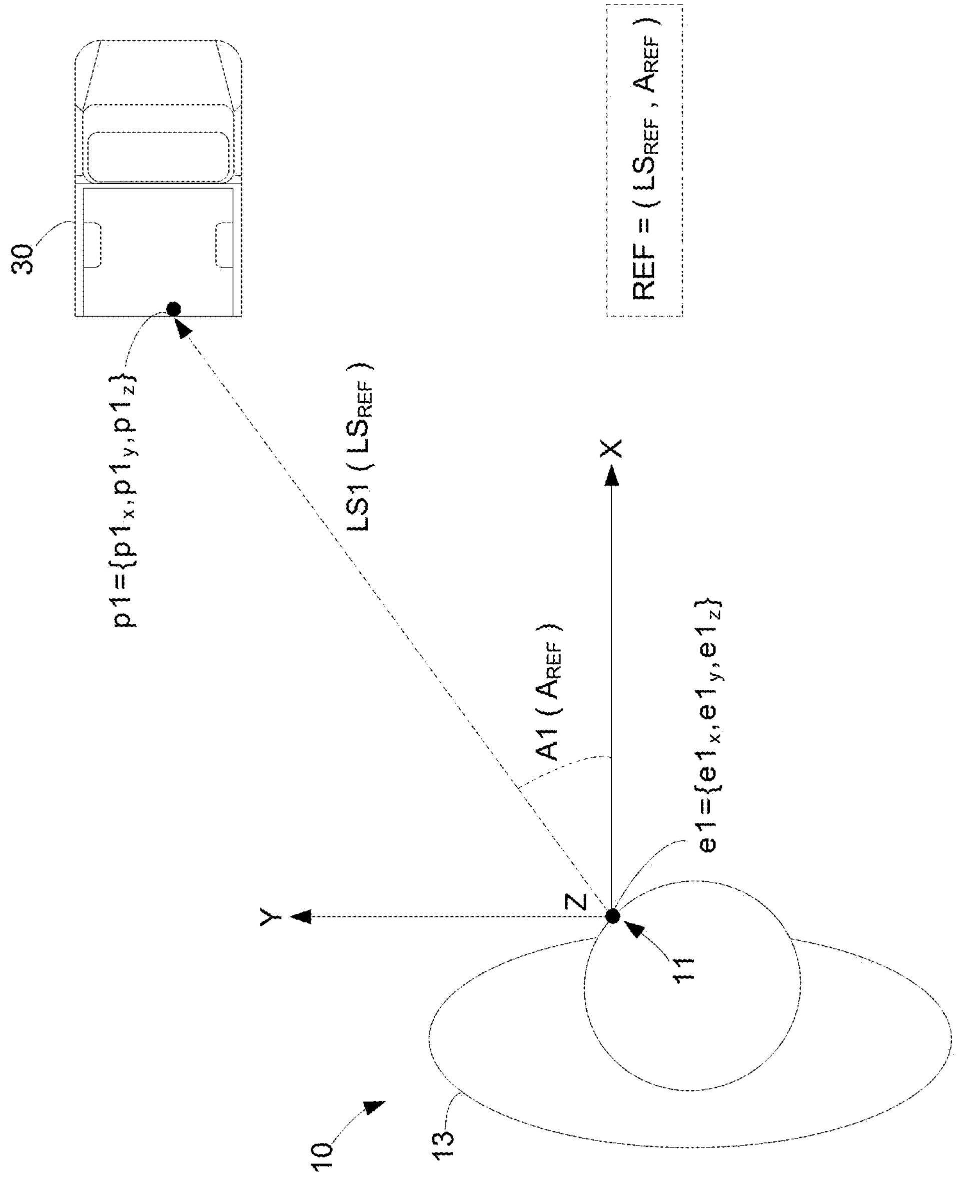
FIG. 2 is a schematic diagram of the line-of-sight of the left eye of the user.

FIG. 2 is a schematic diagram of the line-of-sight LS1 of the left eye 11 of the user 10. The line-of-sight LS1 can be specifically described according to a coordinate system defined by an X-axis, a Y-axis, and a Z-axis. The eye position e1 of the left eye 11 is taken as a reference point of the coordinate system, and the X-axis, the Y-axis, and the Z-axis all pass through the reference point. The Z axis is, for example, substantially perpendicular to the ground. When the user 10 is sitting inside the vehicle, the upper body trunk 13 of the user 10 is substantially parallel to the Z axis. On the other hand, both the X-axis and the Y-axis are orthogonal to the Z-axis. The X-axis is, for example, a front direction of the upper body trunk 13 of the user 10.

The line-of-sight LS1 of the left eye 11 extends from the eye position e1 to a target position p1 of the target object 30. There is an angle A1 between the line-of-sight LS1 and the X-axis, and the direction of the line-of-sight LS1 can be defined according to the angle A1. In a three-dimensional space, there is also an angle between the line-of-sight LS1 and the Z axis, and the embodiment of FIG. 2 does not show the angle between the line-of-sight LS1 and the Z axis. The direction of the line-of-sight LS1 is exemplified by using a two-dimensional plane formed by the X-axis and the Y-axis. In the following embodiments, the line-of-sight LS1 of the left eye 11 of the user 10 is taken as an example, and the calibrating system 1000 calibrates the line-of-sight LS1.

Figure 3:
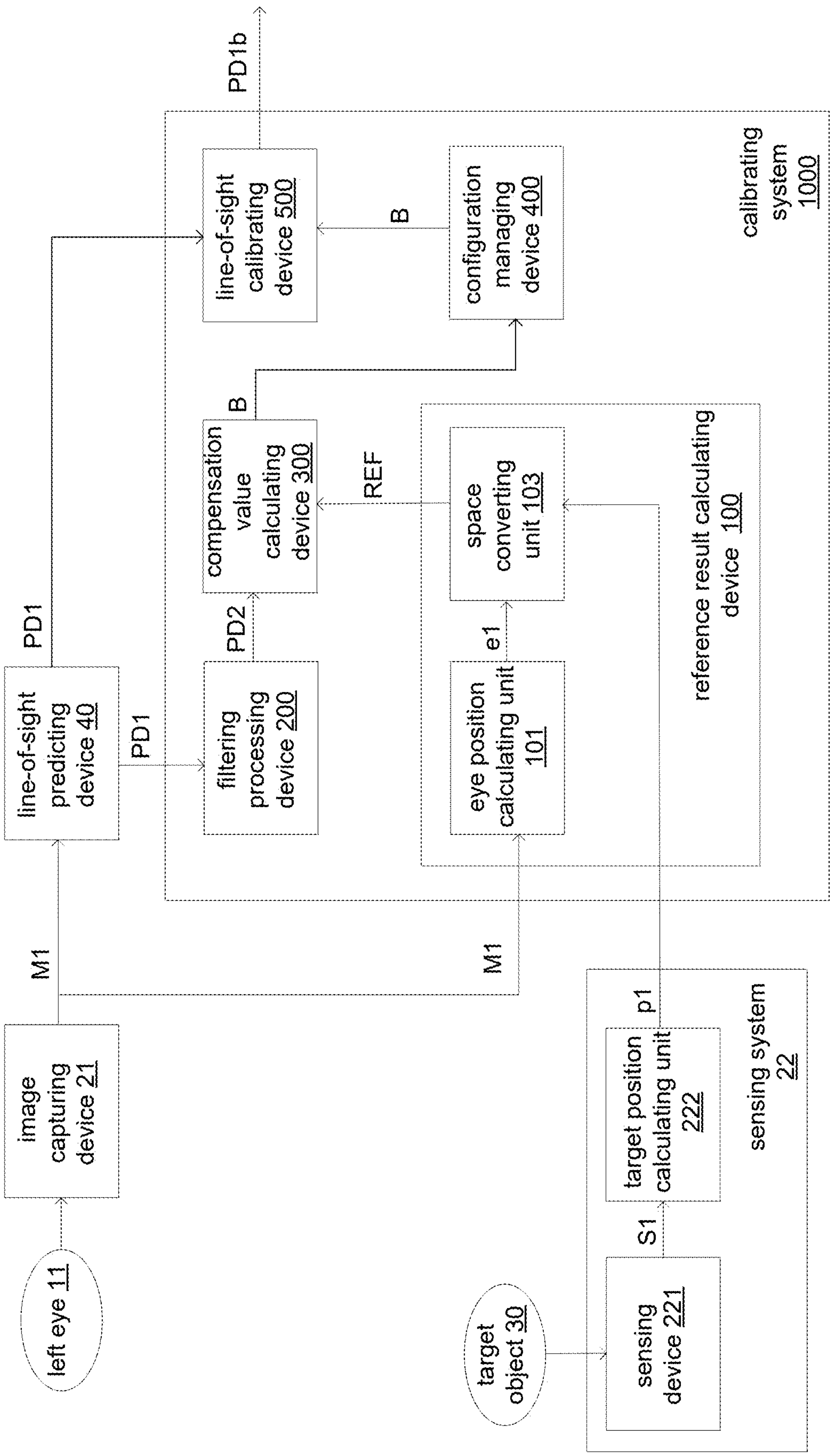
FIG. 3 is a block diagram of a calibrating system according to an embodiment of the present disclosure.
Figure 4:
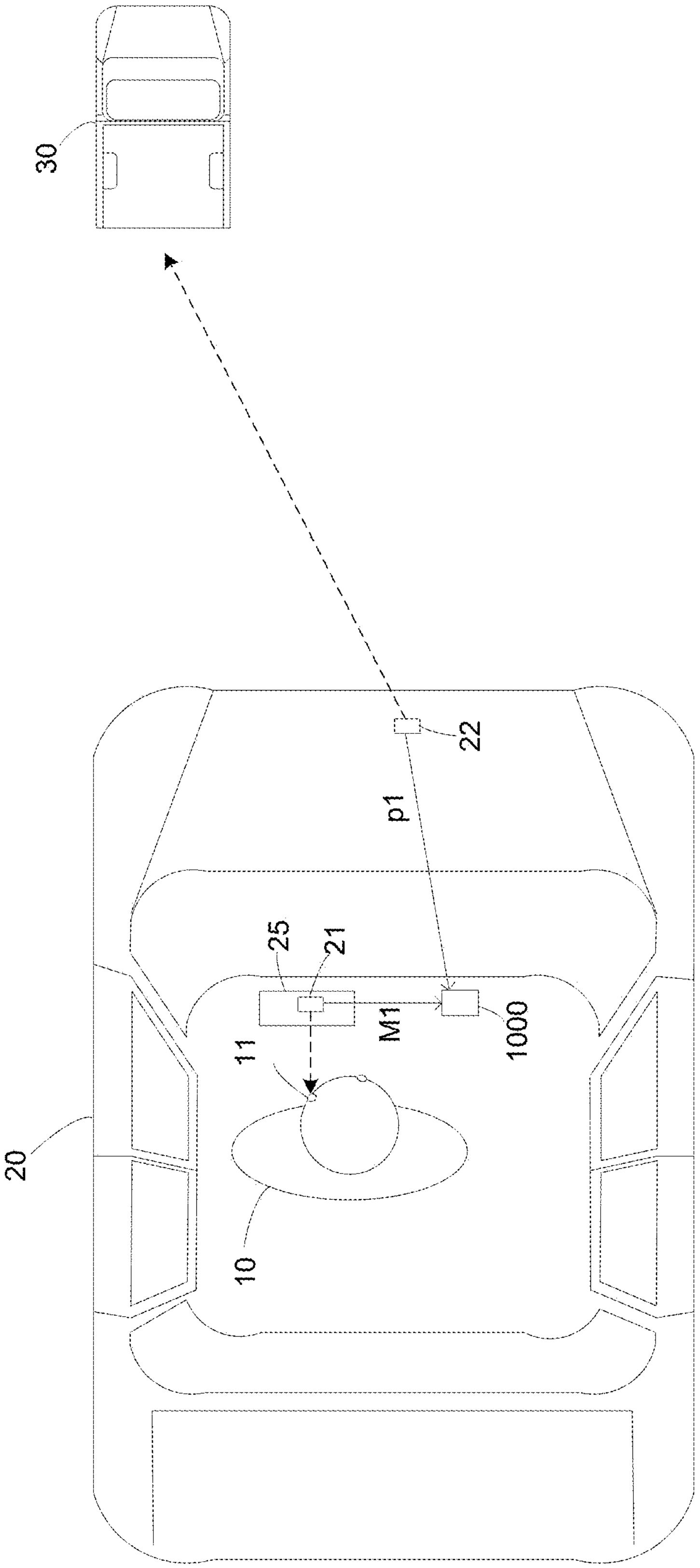
FIG. 4 is a schematic diagram showing the calibrating system is disposed in the vehicle.

FIG. 3 is a block diagram of a calibrating system 1000 according to an embodiment of the present disclosure. FIG. 4 is a schematic diagram showing the calibrating system 1000 is disposed in the vehicle 20. Please refer to FIGS. 3 and 4, the calibrating system 1000 includes a reference result calculating device 100, a filtering processing device 200, a compensation value calculating device 300, a configuration managing device 400 and a line-of-sight calibrating device 500. The reference result calculating device 100 includes an eye position calculating unit 101 and a space converting unit 103.

In one example, the calibrating system 1000 is a hardware circuit disposed inside the vehicle, such as a hardware processor, including (but not limited to) a digital signal processor (DSP), a central processing unit (CPU), and a micro control unit (MCU), etc. The reference result calculating device 100, the filtering processing device 200, the compensation value calculating device 300, the configuration managing device 400 and the line-of-sight calibrating device 500 are hardware circuit units inside the calibrating system 1000.

In another example, the calibrating system 1000 is implemented by a software program module. The overall function of the calibrating system 1000 is realized by executing internal software codes (the software codes include several instructions) by a hardware processor (e.g., a digital signal processor, a central processing unit, or a microcontroller unit) or a hardware device (e.g., a controller, a computer device, or a computer). Furthermore, the reference result calculating device 100, the filtering processing device 200, the compensation value calculating device 300, the configuration managing device 400 and the line-of-sight calibrating device 500 inside the calibrating system 1000 are all software modules, and their respective functions are realized by software codes. The software codes mentioned above may be stored in a non-transitory computer-readable storage medium. The non-transitory computer-readable storage medium is, for example, various forms of non-transitory (non-volatile) memory, hard disk, USB flash drive and other storage devices. The non-transitory computer-readable storage medium may be electrically connected to a hardware processor or a hardware device, or the non-transitory computer-readable storage medium may be disposed in the hardware processor or the hardware device. When the hardware processor or hardware device reads the above-mentioned software codes from the non-transitory computer-readable storage medium, the hardware processor or hardware device can execute the instructions in the software codes to realize the respective functions of the reference result calculating device 100, the filtering processing device 200, the compensation value calculating device 300, the configuration managing device 400 and the line-of-sight calibrating device 500.

The calibrating system 1000 cooperates with an image capturing device 21, a sensing system 22 and a line-of-sight predicting device 40. The image capturing device 21 is a camera disposed inside the vehicle 20. For example, a rearview mirror 25 may be hung on the inner side of the roof of the vehicle 20, and the image capturing device 21 may be installed on the rearview mirror 25, with the lens of the image capturing device 21 facing the user 10. The image capturing device 21 captures the face of the user 10 to generate a first image M1. The first image M1 includes the eyes of the user 10, for example, the left eye 11 of the user. The image capturing device 21 generates the first image M1, and transmits the first image M1 to the eye position calculating unit 101 of the reference result calculating device 100.

The eye position calculating unit 101 performs image processing based on the first image M1, so as to calculate the eye position e1 of the left eye 11. Please also refer to FIG. 2, the eye position e1 of the left eye 11 can be further represented by the coordinate position $\{e1_x, e1_y, e1_z\}$ of the X-axis, the Y-axis and the Z-axis.

Next, please also refer to FIG. 4, the vehicle 20 is further provided with the sensing system 22. The sensing system 22 is also an external component independent of the calibrating system 1000. The sensing system 22 includes a sensing device 221 and a target position calculating unit 222. The sensing device 221 is, for example, a radar sensing device or a Lidar sensing device. The sensing device 221 senses (e.g., measures the distance of) a target object 30 outside the vehicle to obtain a sensing result S1 of the target object 30. The sensing device 221 transmits the sensing result S1 associated with the target object 30 to the target position calculating unit 222. The target position calculating unit 222 performs analysis based on the sensing result S1 to calculate the target position p1 of the target object 30. Referring to FIG. 2, the target position p1 of the target object 30 can be further represented by the coordinate positions $\{p1_x, p1_y, p1_z\}$ of the X-axis, Y-axis and Z-axis.

Then, the space converting unit 103 of the reference result calculating device 100 calculates the angle A1 between the line-of-sight LS1 of the left eye 11 and the X-axis based on the eye position e1 and the target position p1. Furthermore, the space converting unit 103 defines the direction of the line-of-sight LS1 according to the angle A1 between the line-of-sight LS1 and the X-axis. The reference result calculating device 100 uses the line-of-sight LS1 as the reference line-of-sight $LS_{REF}$, and uses the angle A1 as the reference line-of-sight angle $A_{REF}$.

As described above, the target position calculating unit 222 of the sensing system 22 analyzes the sensing result S1 obtained by the sensing device 221 to obtain the target position p1 of the target object 30, which has a higher accuracy and hence a higher reliability, which can reflect a real position of the target object 30. In other words, the reference line-of-sight $LS_{REF}$ and the reference line-of-sight angle $A_{REF}$ obtained by the reference result calculating device 100 based on the above target position p1, may have a higher degree of reliability. The reference line-of-sight $LS_{REF}$ and the reference line-of-sight angle $A_{REF}$ may be totally referred to as a reference result REF. The reference result REF can better reflect an actual status of the line-of-sight LS1 of the user 10 (i.e., a "Ground Truth (GT)"). Furthermore, the reference result calculating device 100 transmits the reference result REF to the compensation value calculating device 300.

The image capturing device 21 also transmits the first image M1 (which includes the left eye 11) to the line-of-sight predicting device 40 for performing a line-of-sight prediction. Similar to the image capturing device 21 and the sensing system 22 which are external devices separated from the calibrating system 1000 of the present disclosure, the line-of-sight predicting device 40 is also separated from the calibrating system 1000. In the example of FIG. 3, the line-of-sight predicting device 40 and the image capturing device 21 are two independent devices. Alternatively, in other examples, the line-of-sight predicting device 40 may also be integrated into the image capturing device 21.

In operation, the line-of-sight predicting device 40 performs a line-of-sight prediction on the line-of-sight LS1 of the left eye 11 based on the first image M1 generated by the image capturing device 21, so as to generate a first line-of-sight predicted result PD1 of the left eye 11 of the user 10. More specifically, the image capturing device 21 performs several times of image captures of the left eye 11 of the user 10 at several time points within a specific time interval, so as to generate several ones of the first image M1 respectively. The line-of-sight predicting device 40 performs several times of line-of-sight predictions on the above-mentioned several ones of the first image M1, so as to generate several ones of the first line-of-sight predicted result PD1 corresponding to these time points.

The line-of-sight predicting device 40 performs only a preliminary prediction, and the stability of the first line-of-sight predicted result PD1 may be relatively low. Therefore, the line-of-sight prediction performed by the line-of-sight predicting device 40 is referred to as a "coarse prediction".

Figure 5A:
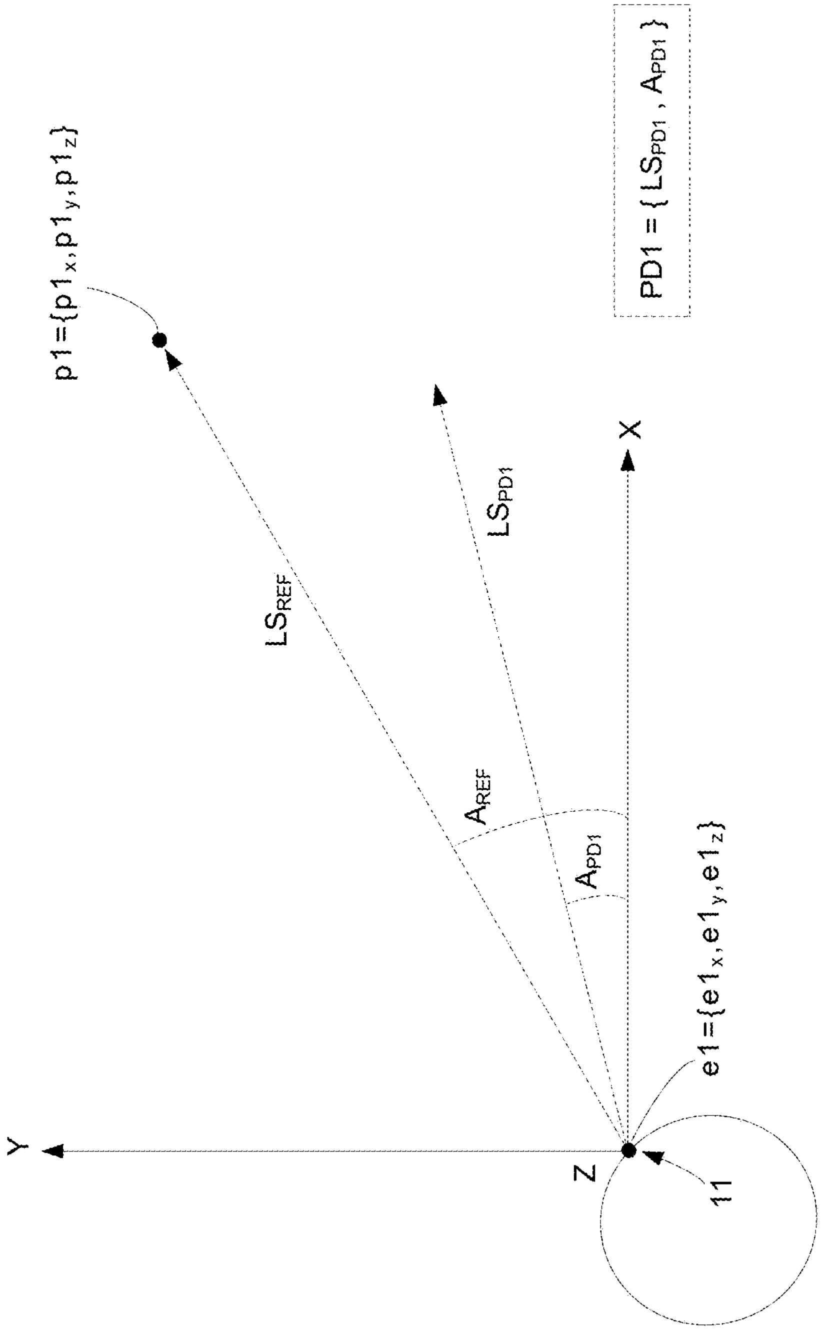
FIG. 5A is a schematic diagram of the first line-of-sight predicted result.

Please refer to FIG. 5A, which is a schematic diagram of the first line-of-sight predicted result PD1. As mentioned above, the line-of-sight predicting device 40 performs multiple line-of-sight predictions according to multiple of the first image M1 at multiple time points, so as to generate multiple ones of first line-of-sight predicted result PD1. FIG. 5A only shows one of these multiple ones of first line-of-sight predicted result PD1. The first line-of-sight predicted result PD1 includes the predicted line-of-sight direction and line-of-sight angle of the left eye 11. Specifically, the first line-of-sight predicted result PD1 includes a first predicted line-of-sight $LS_{PD1}$ and a first predicted line-of-sight angle $A_{PD1}$, as shown in equation (1):

$$PD1 = \{LS_{PD1}, A_{PD1}\} \tag{1}$$

The predicted line-of-sight direction of the left eye 11 is represented by the first predicted line-of-sight $LS_{PD1}$, and the predicted line-of-sight angle of the left eye 11 is represented by the first predicted line-of-sight angle $A_{PD1}$. The first predicted line-of-sight angle $A_{PD1}$ is, for example, the angle between the first predicted line-of-sight $LS_{PD1}$ and the X-axis. In other words, several ones of the first line-of-sight predicted result PD1 obtained by performing several predictions at several time points may include several ones of first predicted line-of-sight $LS_{PD1}$ and several ones of corresponding first predicted line-of-sight angle $A_{PD1}$. The line-of-sight predicting device 40 transmits those of first line-of-sight predicted result PD1 to the filtering processing device 200.

The filtering processing device 200 performs filtering processing on several ones of first line-of-sight predicted result PD1, so as to generate a second line-of-sight predicted result PD2. The filtering process performed by the filtering process device 200 is, for example, a statistical process performed on several ones of first line-of-sight predicted result PD1, and statistical parameters of the first line-of-sight predicted result PD1 can be calculated. In this embodiment, the statistical process is, for example, probability distribution calculation of the first line-of-sight predicted result PD1, which can calculate an average value $E\_A_{PD1}$ of several ones of first predicted line-of-sight angle $A_{PD1}$ and a variation $V\_A_{PD1}$ of the probability distribution of the first predicted line-of-sight angle $A_{PD1}$. These several ones of first predicted line-of-sight angle $A_{PD1}$ have a distribution range R0 of the probability distribution. The distribution center of the distribution range R0 corresponds to the average value $E\_A_{PD1}$, and the size of the probability interval of the distribution range R0 depends on the variation $V\_A_{PD1}$.

Figure 5B:
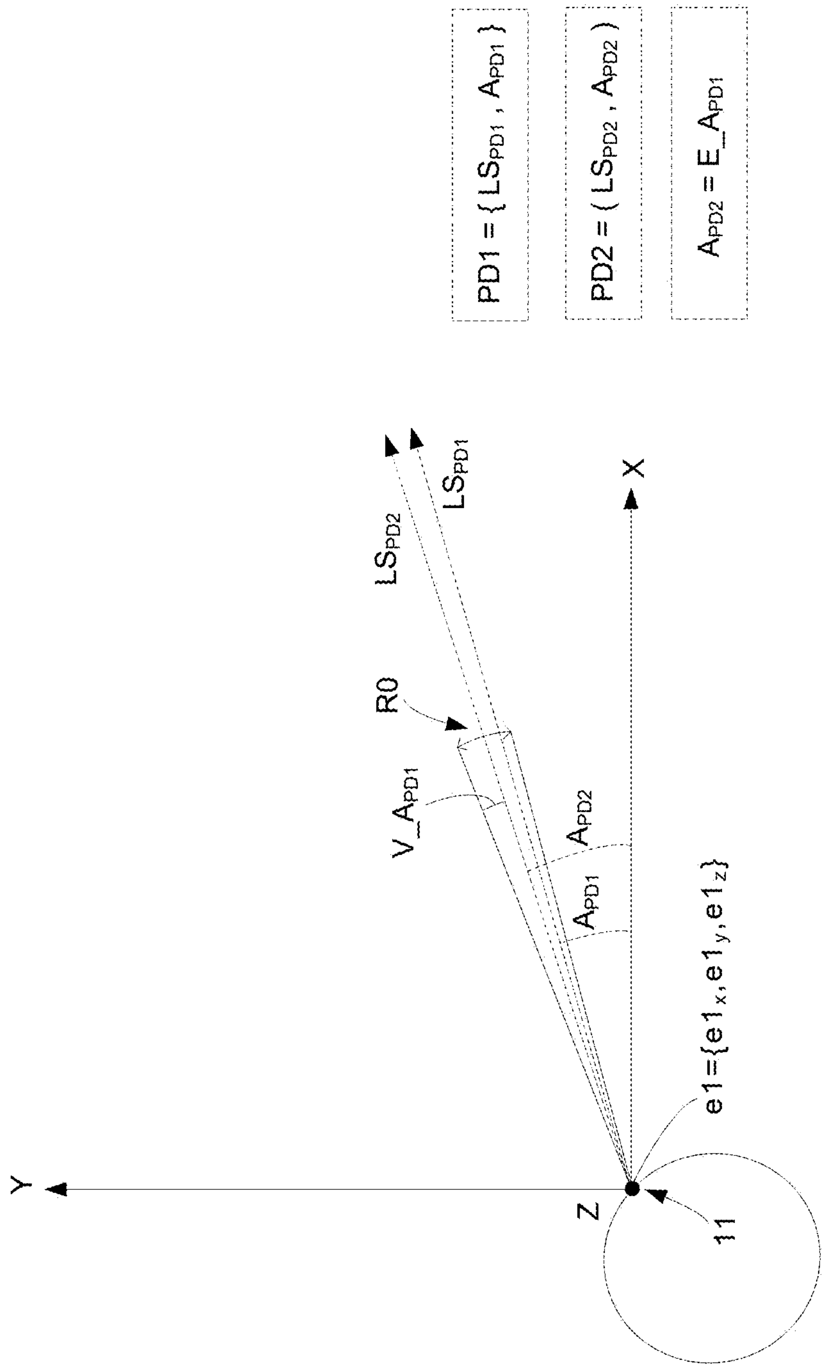
FIG. 5B is a schematic diagram of the second line-of-sight predicted result.

Next, please refer to FIG. 5B, which is a schematic diagram of the second line-of-sight predicted result PD2. The filtering processing device 200 takes the average value $E\_A_{PD1}$ of several ones of first predicted line-of-sight angle $A_{PD1}$ as the second predicted line-of-sight angle $A_{PD2}$. In other words, the filtering processing device 200 averages several ones of first predicted line-of-sight angle APD1 to obtain the second predicted line-of-sight angle APD2.

Furthermore, the line-of-sight corresponding to the second predicted line-of-sight angle $A_{PD2}$ is the second predicted line-of-sight $LS_{PD2}$. The filtering processing device 200 integrates the second predicted line-of-sight angle $A_{PD2}$ and the second predicted line-of-sight $LS_{PD2}$ into a second line-of-sight predicted result PD2. That is, the second line-of-sight predicted result PD2 includes the second predicted line-of-sight angle $A_{PD2}$ and the corresponding second predicted line-of-sight $LS_{PD2}$, as shown in equation (2):

$$PD2=\{LS_{PD2},A_{PD2}\} \tag{2}$$

As mentioned above, the line-of-sight predicting device 40 performs a coarse prediction to generate several ones of first line-of-sight predicted result PD1. The second line-of-sight predicted result PD2 is a result by further filtering process one several ones of first line-of-sight predicted result PD1. Therefore, the second line-of-sight predicted result PD2 has a higher stability, and the filtering process performed by the filtering processing device 200 can be referred to as a "fine prediction".

The filtering processing device 200 transmits the second line-of-sight predicted result PD2 to the compensation value calculating device 300. On the other hand, the compensation value calculating device 300 receives the reference result REF generated by the space converting unit 103 of the reference result calculating device 100. The compensation value calculating device 300 estimates an bias value B according to the second line-of-sight predicted result PD2 and the reference result REF. The bias value B is used as the compensation value, with a function of compensating for the first line-of-sight predicted result PD1 generated by the line-of-sight predicting device 40 in the future.

Figure 5C:
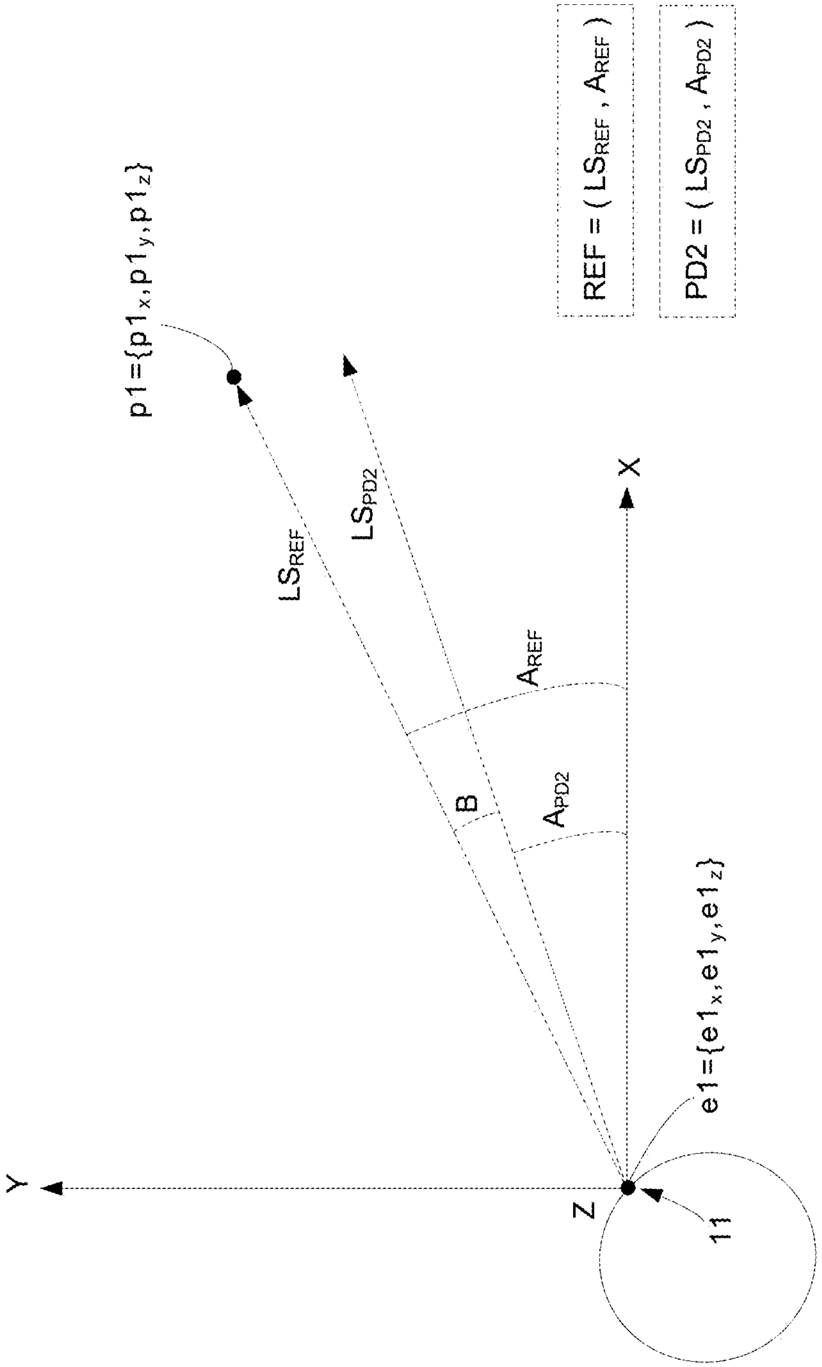
FIG. 5C is a schematic diagram of bias value.

Please refer to FIG. 5C, which is a schematic diagram of bias value B. The bias value B is an bias value between the reference line-of-sight $LS_{REF}$ in the reference result REF and the second predicted line-of-sight $LS_{PD2}$ in the second line-of-sight predicted result PD2 (i.e., represents an error degree of the second line-of-sight predicted result PD2 compared with the reference result REF). In one example, a difference between the reference line-of-sight angle AREF and the second predicted line-of-sight angle APD2 is taken as the bias value B.

Furthermore, the compensation value calculating device 300 defines an valid region R1 based on the reference line-of-sight angle $A_{REF}$, the bias value B and the variation $V\_A_{PD1}$ (as mentioned above, the variation $V\_A_{PD1}$ is the variation of the probability distribution of several ones of the first predicted line-of-sight angle APD1 at several time points).

Figure 6A:
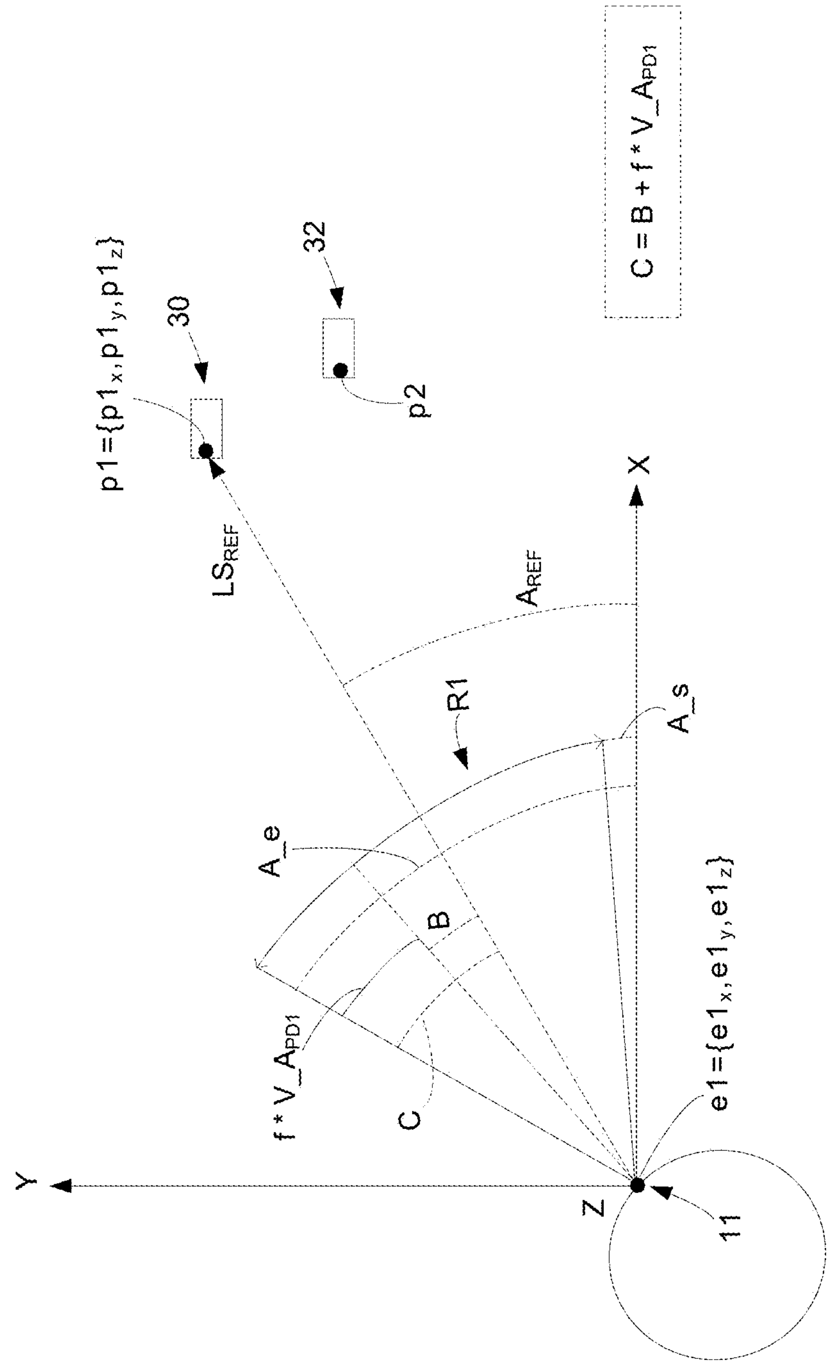
FIGS. 6A and 6B are schematic diagrams of the valid region.
Figure 6B:
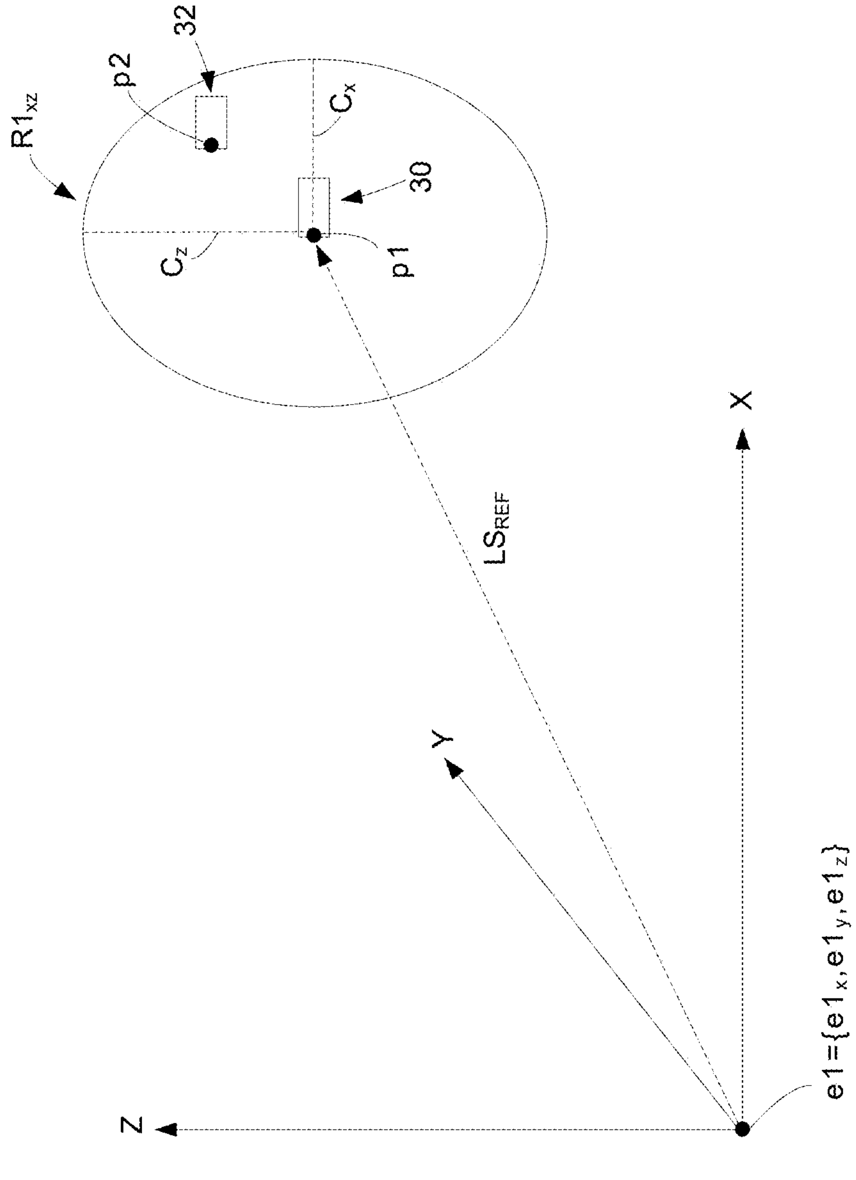

Next, please refer to FIGS. 6A and 6B, which are schematic diagrams of the valid region R1. In FIG. 6A, the valid region R1 is defined based on a reference center and a span value C. The valid region R1 extends outward from the reference center with the span value C. The reference center of the valid region R1 corresponds to the reference line-of-sight $LS_{REF}$ of the reference line-of-sight angle $A_{REF}$. The span value C of the valid region R1 is equal to a product of the variation $V\_A_{PD1}$ and a factor f plus the bias value B. The factor f is a positive integer or a decimal, for example, a positive integer "3". In other words, the angle obtained by subtracting the span value C from the reference line-of-sight angle $A_{REF}$ is used as a "starting angle A_s", and the angle obtained by adding the span value C to the reference line-of-sight angle $A_{REF}$ is used as an "ending angle A_e". Then, the valid region R1 is an angle range covered by the "starting angle A_s" to the "ending angle A_e".

The substantial meaning of the span value C being equal to the product of the variation $V\_A_{PD1}$ and the factor f added to the bias value B is that, the variation $V\_A_{PD1}$ of the first predicted line-of-sight angle $A_{PD1}$ and the bias value B of the second predicted line-of-sight angle $A_{PD2}$ are taken into consideration together, so as to evaluate the overall error of the line-of-sight predicting device 40. In other words, the span value C can represent the overall error of the line-of-sight predicting device 40. Therefore, the valid region R1 which is expanded according to the span value C, may represent the angle range where the target position p1 of the target object 30 may exist. Every angle within the valid region R1 may be an angle of the target position p1. If more than two targets are detected within the valid region R1 (i.e., the valid region R1 includes another target object 32 rather than the target object 30, and the target position p2 of the target object 32 falls within the angle range of the valid region R1), the second line-of-sight predicted result PD2 obtained by the line-of-sight predicting device 40 and the filtering processing device 200 in this prediction may be deemed as invalid.

On the contrary, if there is only a single target object 30 in the valid region R1, the second line-of-sight predicted result PD2 generated this time is deemed as valid, and its corresponding bias value B (i.e., the difference between the reference line-of-sight angle $A_{REF}$ and the second predicted line-of-sight angle $A_{PD2}$ generated this time) is determined as valid. The compensation value calculating device 300 transmits the bias value B, which is determined to be valid this time, to the configuration managing device 400. Furthermore, the configuration managing device 400 updates the bias value B (which is valid) in a configuration file.

FIG. 6A only uses the two-dimensional plane of the X-axis and the Y-axis as an example to illustrate the coverage of the valid region R1. Please refer to FIG. 6B, which illustrates the coverage of the valid region $R1_{xz}$ in the three-dimensional space of the X-axis, the Y-axis, and the Z-axis. In the three-dimensional space of the X-axis, the Y-axis and the Z-axis, the reference line-of-sight $LS_{REF}$ may point to the reference center of the valid region $R1_{xz}$ (i.e., the reference center of the valid region $R1_{xz}$ is the target position p1 of the target object 30). Furthermore, the valid region $R1_{xz}$ has span values of two-dimensions, which are span value $C_x$ and span value $C_z$. The span value $C_x$ is just the span value C shown in FIG. 6A, which is the expansion angle range of the valid region R1 in the two-dimensional plane of the X-axis and the Y-axis. Furthermore, the span value $C_z$ is the expansion angle range of the valid region $R1_{xz}$ in the two-dimensional plane of the Y-axis and the Z-axis. The definition of span value $C_z$ is similar to that of span value $C_x$. The span value $C_z$ is equal to a sum of multiples of variation and a bias value between the reference line-of-sight $LS_{REF}$ and the Z axis (not shown in FIG. 6B). When determining the validity of the second line-of-sight predicted result PD2, if the target position p2 of the target object 32 (other than the target object 30) falls within the range of the valid region $R1_{xz}$, the second line-of-sight predicted result PD2 obtained in the current prediction by the line-of-sight predicting device 40 and filtering processing device 200 is determined as invalid. On the contrary, if only the target position p1 of the target object 30 is detected in the valid region $R1_{xz}$, the second line-of-sight predicted result PD2 obtained in the current prediction is determined to be valid. The configuration managing device 400 only updates the bias value B, which corresponds to the second line-of-sight predicted result PD2 that is determined to be valid, in the configuration file.

In summary, based on the embodiments of FIGS. 3, 5A~5C, 6A and 6B, when the left eye 11 of the user 10 gazes at the target object 30 according to a certain line-of-sight angle, the image capturing device 21 generates a first image M1 including the left eye 11, and the line-of-sight predicting device 40 predicts the line-of-sight LS1 of the left eye 11 according to the first image M1, so as to obtain the first line-of-sight predicted result PD1. The calibrating system 1000 may determine whether to include the first line-of-sight predicted result PD1 into the compensation calculation process, according to some predefined conditions. One of the predefined conditions is, for example, a complexity of the environment outside the vehicle. If the complexity of the environment is high, the calibrating system 1000 does not include the first line-of-sight predicted result PD1 into the compensation calculation process. In one example, the calibrating system 1000 may consider the sensing result S1 generated by the sensing device 221 to determine the complexity of the environment outside the vehicle. If the sensing result S1 indicates that the number of objects in the environment is relatively large (e.g., the number of objects is greater than an upper limit), the calibrating system 1000 does not include the first line-of-sight predicted result PD1 into the compensation calculation process. If the sensing result S1 indicates that the number of objects in the environment is less than the upper limit, the first line-of-sight predicted result PD1 is included in the compensation calculation process.

Furthermore, the filtering processing device 200 of the calibrating system 1000 performs filtering processing based on the first line-of-sight predicted result PD1 (which is adopted in the compensation calculation process) to obtain the second line-of-sight predicted result PD2 (which includes the second predicted line-of-sight $LS_{PD2}$ and the second predicted line-of-sight angle $A_{PD2}$). On the other hand, the reference result calculating device 100 of the calibrating system 1000 calculates the reference result REF (which includes the reference line-of-sight $LS_{REF}$ and the reference line-of-sight angle $A_{REF}$) of the left eye 11 according to the first image M1 and the target position p1 of the target object 30. Then, the compensation value calculating device 300 of the calibrating system 1000 calculates the bias value B according to the second line-of-sight predicted result PD2 and the reference result REF. Furthermore, the compensation value calculating device 300 can determine whether the second line-of-sight predicted result PD2 is valid according to the number of targets within the valid region R1. If the second line-of-sight predicted result PD2 is valid, the calibrating system 1000 can adopt the bias value B corresponding to the second line-of-sight predicted result PD2 which is valid, and the compensation value calculating device 300 transmits the bias value B (which is adopted) to the configuration managing device 400, and the configuration managing device 400 updates this adopted bias value B in the configuration file. Similarly, the left eye 11 of the user 10 may gaze at other targets according to another line-of-sight angle, and the compensation value calculating device 300 calculates the bias value B corresponding to this line-of-sight angle. Furthermore, the compensation value calculating device 300 can calculate an bias value B for each of several line-of-sight angles within a predetermined angle range, and update these bias values B in the configuration file of the configuration managing device 400. The configuration managing device 400 will continuously record the bias value B corresponding to each line-of-sight angle, which will be described in detail in the following paragraphs.

Figure 7A:
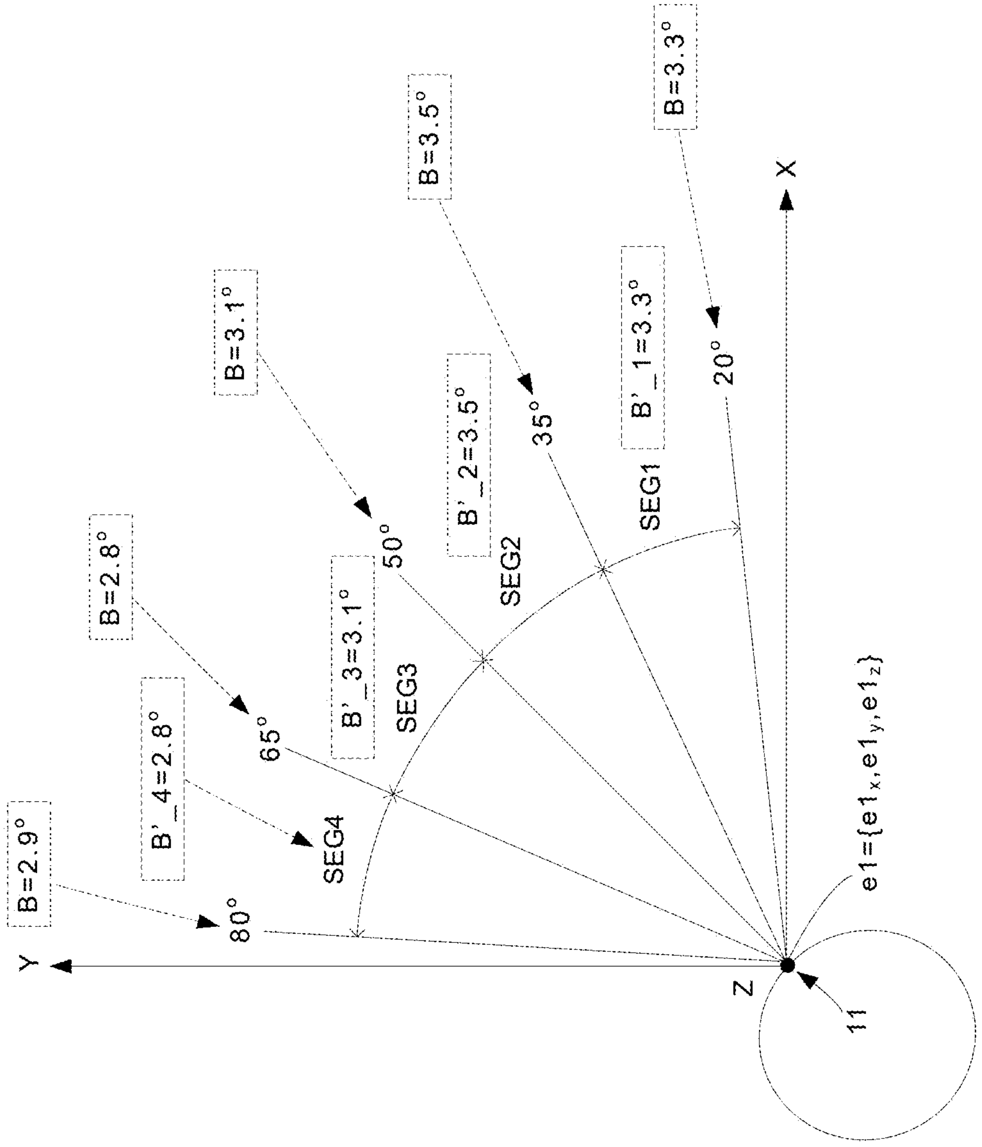
FIG. 7A is a schematic diagram showing the compensation value calculating device calculates the bias value within a predetermined angle range and sets a calibration point.

Please refer to FIG. 7A, which is a schematic diagram showing the compensation value calculating device 300 calculates the bias value B within a predetermined angle range and sets a calibration point. The compensation value calculating device 300 calculates the bias value B corresponding to the second line-of-sight predicted result PD2 at different angles. For example, the bias value B corresponding to the second line-of-sight predicted result PD2 is calculated at 20 degree, 35 degree, 50 degree, 65 degree and 80 degree respectively.

The bias value B calculated at 20 degree is "3.3 degree", the bias value B calculated at 35 degree is "3.5 degree", the bias value B calculated at 50 degree is "3.1 degree", the bias value B calculated at 65 degree is "2.8 degree", and the bias value B calculated at 80 degree is "2.9 degree".

The above-mentioned several ones of bias value B with values of "3.3 degree", "3.5 degree", "3.1 degree", "2.8 degree" and "2.9 degree" are discretized by binning, and then set as several calibration points.

According to the above mechanism, the compensation value calculating device 300 sets several calibration points, for example, five calibration points, which correspond to 20 degree, 35 degree, 50 degree, 65 degree and 80 degree respectively. When the first predicted line-of-sight angle $A_{PD1}$ predicted by the line-of-sight predicting device 40 in the future is equal to one of these five of calibration points (i.e., 20 degree, 35 degree, 50 degree, 65 degree and 80 degree), the line-of-sight calibrating device 500 directly compensates the first predicted line-of-sight angle $A_{PD1}$ which is obtained in the further (referred to as a "further first predicted line-of-sight angle"), with an average value of several ones of the bias value B. Those of the bias value B are obtained at the calibration points corresponding to the angles equal to those of the first predicted line-of-sight angle $A_{PD1}$ recorded in the configuration file, and the average value of several ones of the bias value B may be referred to as an average bias value B'. That is, an average bias value B' of the calibration points corresponding to the angles equal to those of the first predicted line-of-sight angle APD1, is added to the first predicted line-of-sight angle $A_{PD1}$, so as to obtain a calibrated line-of-sight predicted result PD1b.

If the first predicted line-of-sight angle APD1, which is predicted in the future, is not equal to any of the five calibration points of 20 degree, 35 degree, 50 degree, 65 degree and 80 degree, the line-of-sight calibrating device 500 performs compensation with an average bias value corresponding to an interval in which the first predicted line-of-sight angle $A_{PD1}$ falls. Such an interval is, for example, a range between two adjacent calibration points. For example, a first interval SEG1 is a range between the two calibration points of 20 degree and 35 degree, a second interval SEG2 is a range between the two calibration points of 35 degree and 50 degree, a third interval SEG3 is a range between the two calibration points of 50 degree and 65 degree, and a fourth interval SEG4 is a range between the two calibration points of 65 degree and 80 degree. In one example, several ones of the first predicted line-of-sight angles $A_{PD1}$ falling within the same interval are compensated with the same average bias value, so as to obtain the calibrated line-of-sight predicted result PD1b. Please refer to FIG. 7B, which is a schematic diagram showing the calibration of the first predicted line-of-sight angle $A_{PD1}$ according to the average bias value of the corresponding interval. The first predicted line-of-sight angle $A_{PD1}$ is, for example, 30 degree, which falls within the range of the first interval SEG1. Any of the several ones of first predicted line-of-sight angle APD1, which falls within the first interval SEG1, is compensated with the same average bias value B'_1. The average bias value B of 3.3 degree at the calibration point of 20 degree, at one end point of the first interval SEG1, is taken as the average bias value B'_1 corresponding to the first interval SEG1. The first predicted line-of-sight angle $A_{PD1}$ is added to the average bias value B'_1 of 3.3 degree, forming a compensated line-of-sight angle C_A of 33.3 degree. According to the above method, different ones of the first predicted line-of-sight angle APD1 with different angles within the same interval, may be compensated with the same average bias value. Therefore, calculation complexity and data amount may be reduced.

Similarly, the average bias value B' of 3.5 degree, which corresponds to the calibration point of 35 degree at one end point of the second interval SEG2, is taken as the average bias value B'_2 for the second interval SEG2. Any one of first predicted line-of-sight angle $A_{PD1}$ falling into the second interval SEG2 is compensated with the same average bias value B'_2 (i.e., the first predicted line-of-sight angle $A_{PD1}$ is added by the average bias value B'_2). Similarly, any one of first predicted line-of-sight angle $A_{PD1}$ falling into the third interval SEG3 is compensated with the same average bias value B'_3, and any one of first predicted line-of-sight angle $A_{PD1}$ falling into the fourth interval SEG4 is compensated with the same average bias value B'_4.

In another example, the line-of-sight calibrating device 500 performs an interpolation on respective average bias value B' of two calibration points which are closest to the first predicted line-of-sight angle $A_{PD1}$, and an interpolated value obtained by the interpolation is taken to compensate the first predicted line-of-sight angle $A_{PD1}$. Please refer to FIG. 7A again, a linear interpolation is taken as an example, if the first predicted line-of-sight angle $A_{PD1}$ is 25 degree, a linear interpolated value of the linear interpolation for the average bias value B' of 3.3 degree at calibration point of 20 degree and the average bias value B' of 3.5 degree at calibration point 35 degree (these two calibration points are close to the first predicted line-of-sight angle $A_{PD1}$ of 25 degree) is taken for compensation. The linear interpolated value of the average bias value B' of 3.3 degree and the average bias value B' of 3.5 degree is equal to the following summation result: 3.3 degree multiplied by a factor of ⅔ is summed up with 3.5 degree multiplied by a factor of ⅓.

In another example, the line-of-sight calibrating device 500 performs compensation using the average bias value B' at a calibration point, that corresponds to an angle closest to the first predicted line-of-sight angle $A_{PD1}$.

Figure 7B:
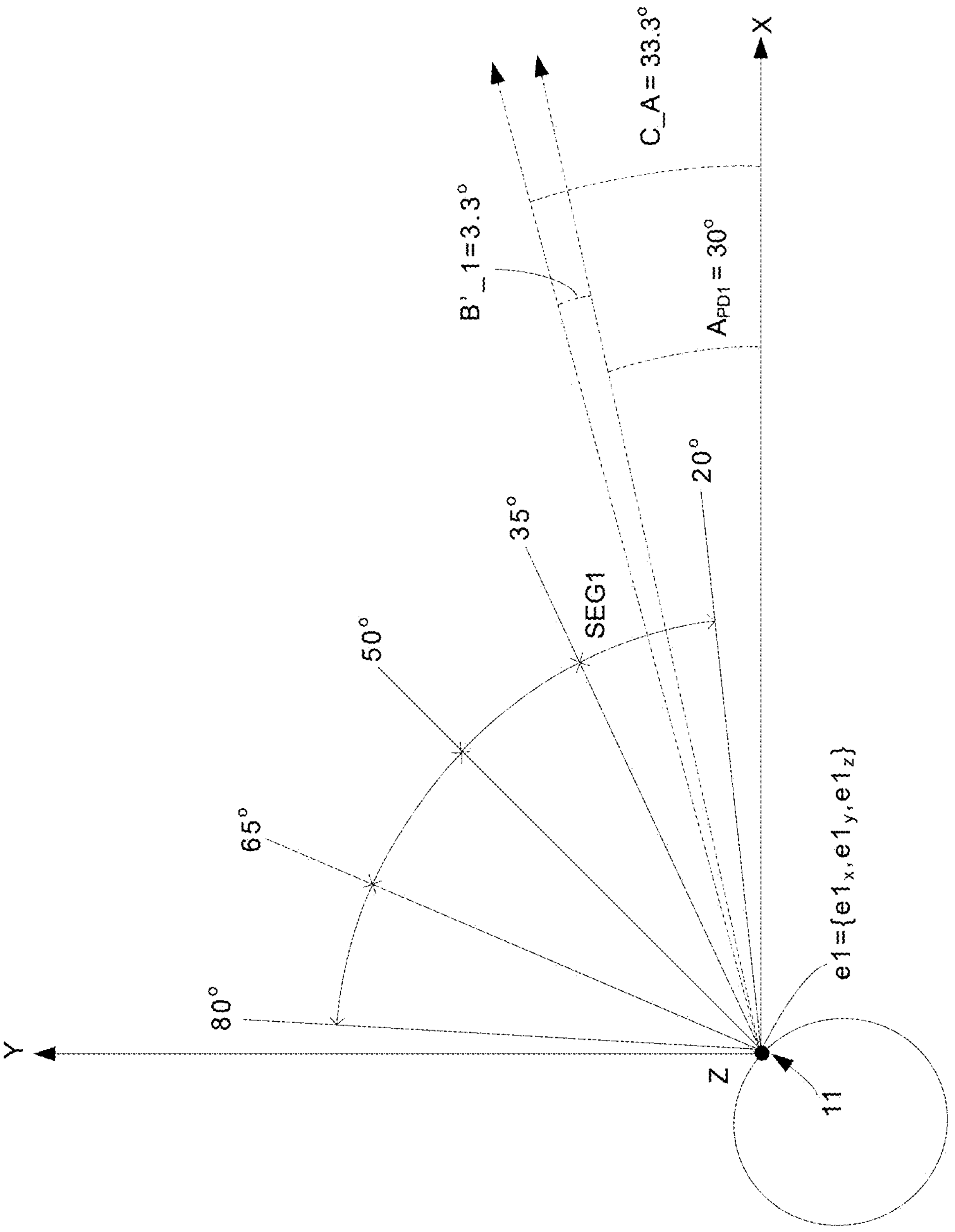
FIG. 7B is a schematic diagram showing the calibration of the first predicted line-of-sight angle according to the average bias value of the corresponding interval.
Figure 7C:
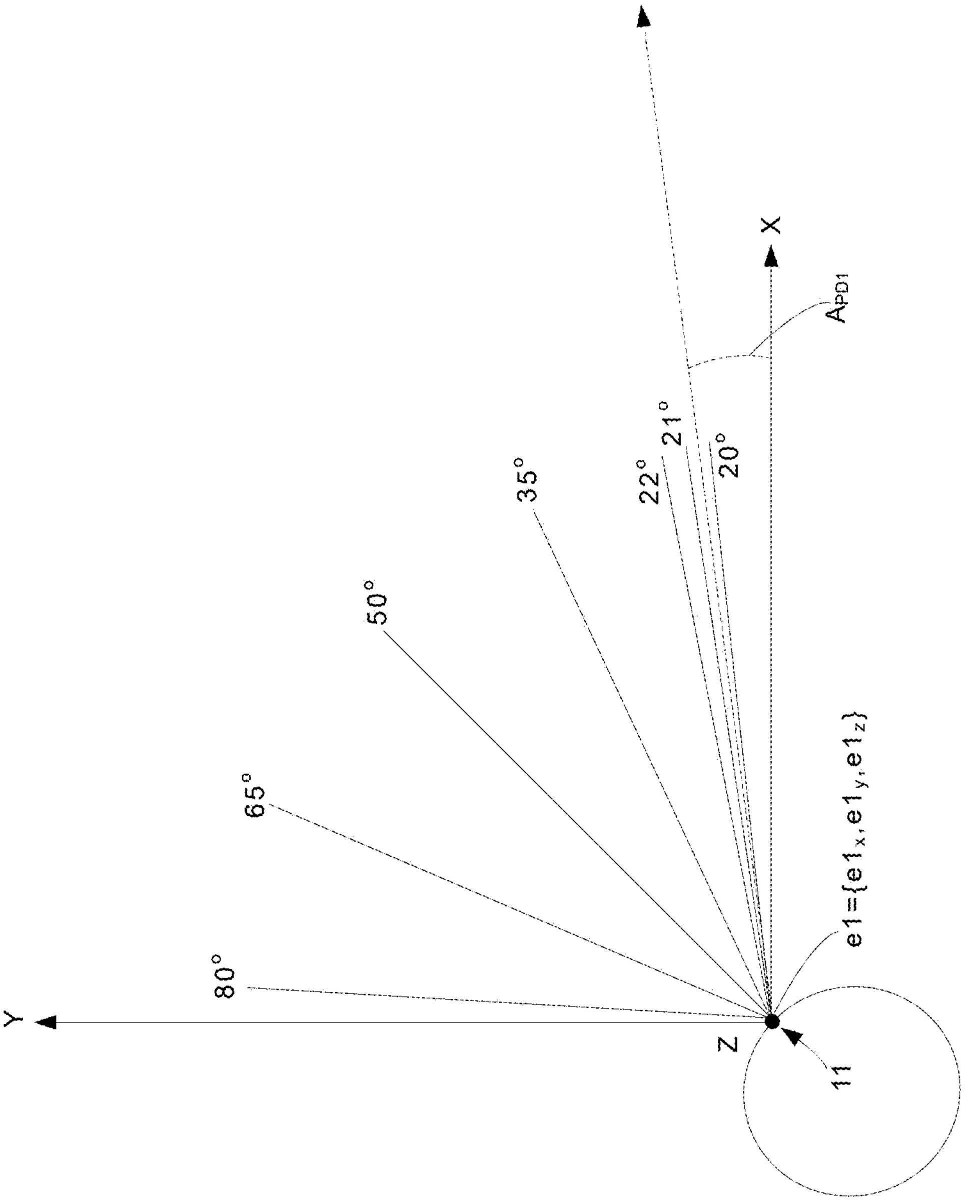
FIG. 7C, which is another schematic diagram of setting calibration points for the compensation value calculating device.

In the embodiment of FIGS. 7A and 7B, an interval between adjacent two of several calibration points is, for example, 15 degree. In addition, please refer to FIG. 7C, which is another schematic diagram of setting calibration points for the compensation value calculating device 300. In the embodiment of FIG. 7C, an interval between adjacent two of several calibration points is 1 degree, where these calibration points have respective angles of 20 degree, 21 degree and 22 degree, etc.

Figure 8:
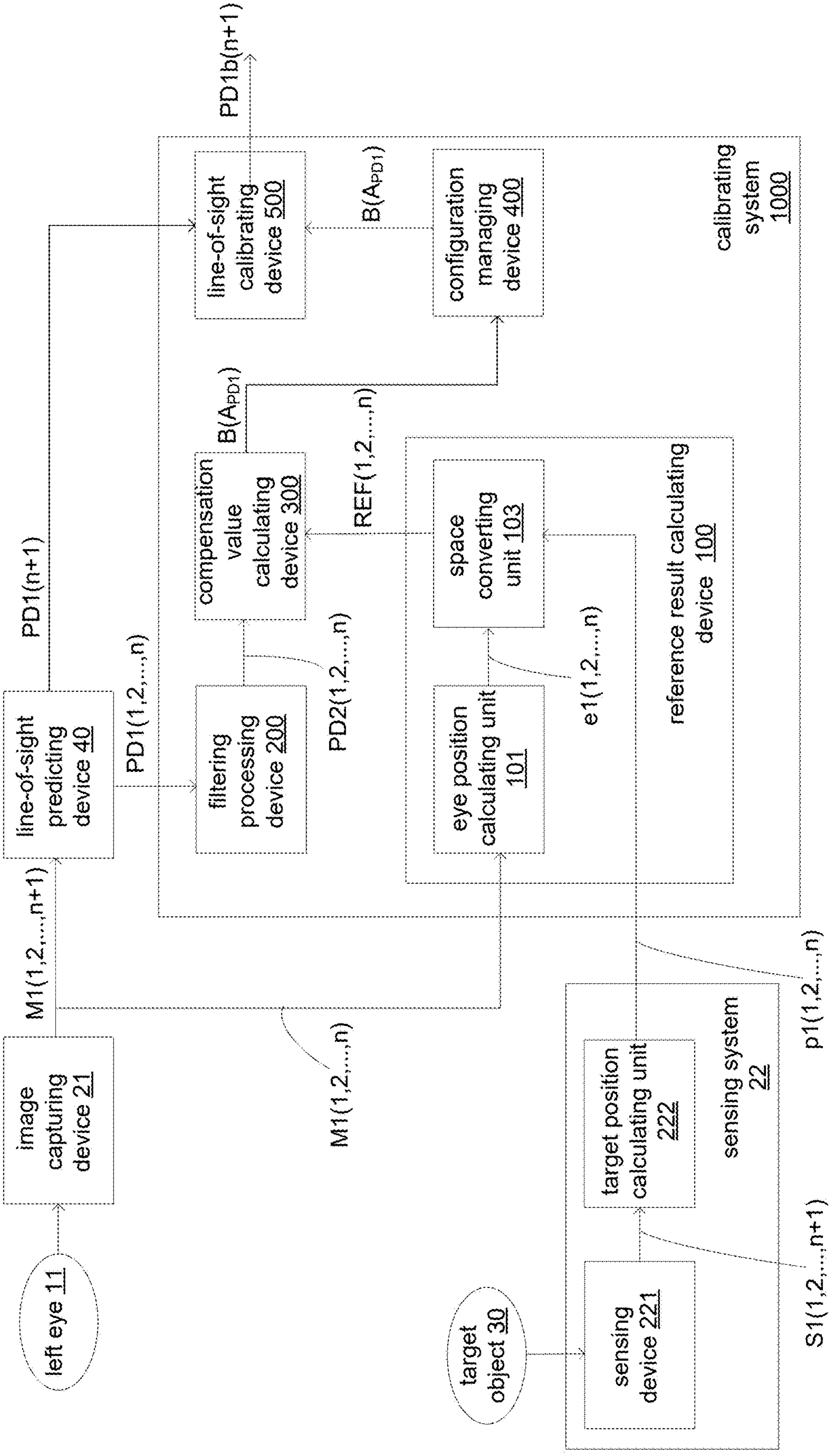
FIG. 8, which is a schematic diagram showing detailed operation of the calibrating system.

Next, please refer to FIG. 8, which is a schematic diagram showing detailed operation of the calibrating system 1000 in FIG. 3. In the example of FIG. 8, each signal has an index "1", an index "2", . . . , an index "n" and an index "n+1", which respectively represent a time point t1, a time point t2, . . . , a time point t(n) and a time point t(n+1). Each time point among time points form the time point t1 to the time point t(n) may represent a "historical time point" of the operation of the calibrating system 1000, and the time point t(n+1) may represent a "future time point" of the operation of the calibrating system 1000.

The image capturing device 21 generates several first images M1(1, 2, . . . , n+1) at the time points t1 to t(n+1). Furthermore, the sensing device 221 of the sensing system 22 generates several sensing results S1(1, 2, . . . , n+1) at the time points t1 to t(n+1). The target position calculating unit 222 of the sensing system 22 generates several target positions p1(1, 2, . . . , n+1) associated with the target object 30 according to the sensing results S1(1, 2, . . . , n+1).

The reference result calculating device 100 of the calibrating system 1000 operates at historical time points t1~t(n), and the eye position calculating unit 101 calculates several eye positions e(1, 2, . . . , n) based on the first images M1(1, 2, . . . , n) at the historical time points t1~t(n). Furthermore, the space converting unit 103 calculates the reference result REF(1, 2, . . . , n) according to the target positions p1(1, 2, . . . , n) at the historical time points t1~t(n).

On the other hand, the line-of-sight predicting device 40 generates several first line-of-sight predicted results PD1(1, 2, . . . , n) according to the first images M1(1, 2, . . . , n) at the historical time points t1~t(n). The filtering processing device 200 performs filtering processing according to the first line-of-sight predicted results PD1(1, 2, . . . , n), so as to generate several second line-of-sight predicted results PD2(1, 2, . . . , n).

At the historical time points t1~t(n), the compensation value calculating device 300 calculates several offset values $B(A_{PD2})$ based on the reference results REF(1, 2, . . . , n) and the second line-of-sight predicted results PD2(1, 2, . . . , n). The second predicted line-of-sight angle $A_{PD2}$ associated with the bias value $B(A_{PD2})$ corresponds to an angle of the calibration point. The compensation value calculating device 300 can determine whether the bias value $B(A_{PD2})$ is valid. If valid, the bias value $B(A_{PD1})$ is transmitted to the configuration managing device 400, and is updated in the configuration file. In the configuration file, the second predicted line-of-sight angle $A_{PD2}$ associated with the bias value $B(A_{PD2})$ is established as a calibration point.

At a future time point t(n+1), the line-of-sight predicting device 40 generates a first line-of-sight predicted result PD1($n$+1) based on the first image M1($n$+1). The first predicted line-of-sight angle $A_{PD1}$(n+1) included in the first line-of-sight predicted result PD1($n$+1) may be referred to as a "future predicted line-of-sight angle". Furthermore, the line-of-sight calibrating device 500 of the calibrating system 1000 operates at a future time point t(n+1), and obtains the average bias value B'($A_{PD2}$) at the calibration point corresponding to the second predicted line-of-sight angle $A_{PD2}$ at the same angle as the first line-of-sight predicted result PD1($n$+1), from the configuration file of the configuration managing device 400. Furthermore, the line-of-sight calibrating device 500 compensates the first predicted line-of-sight angle $A_{PD1}$(n+1) (i.e., the future predicted line-of-sight angle) generated by the line-of-sight predicting device 40 according to the average bias value B'($A_{PD2}$), so as to generate a calibrated line-of-sight predicted result PD1*b*(n+1).

Figure 9A:
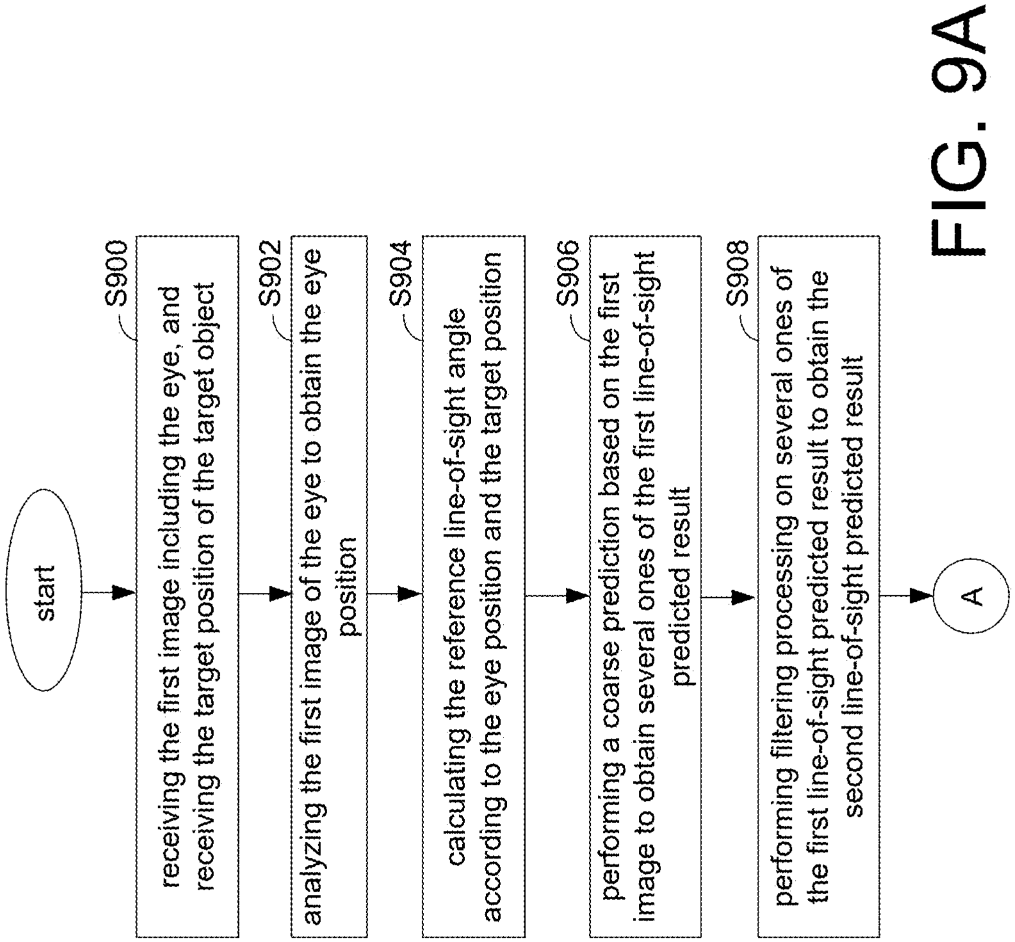
FIGS. 9A and 9B are flow diagrams of a calibrating method according to an embodiment of the present disclosure.
Figure 9B:
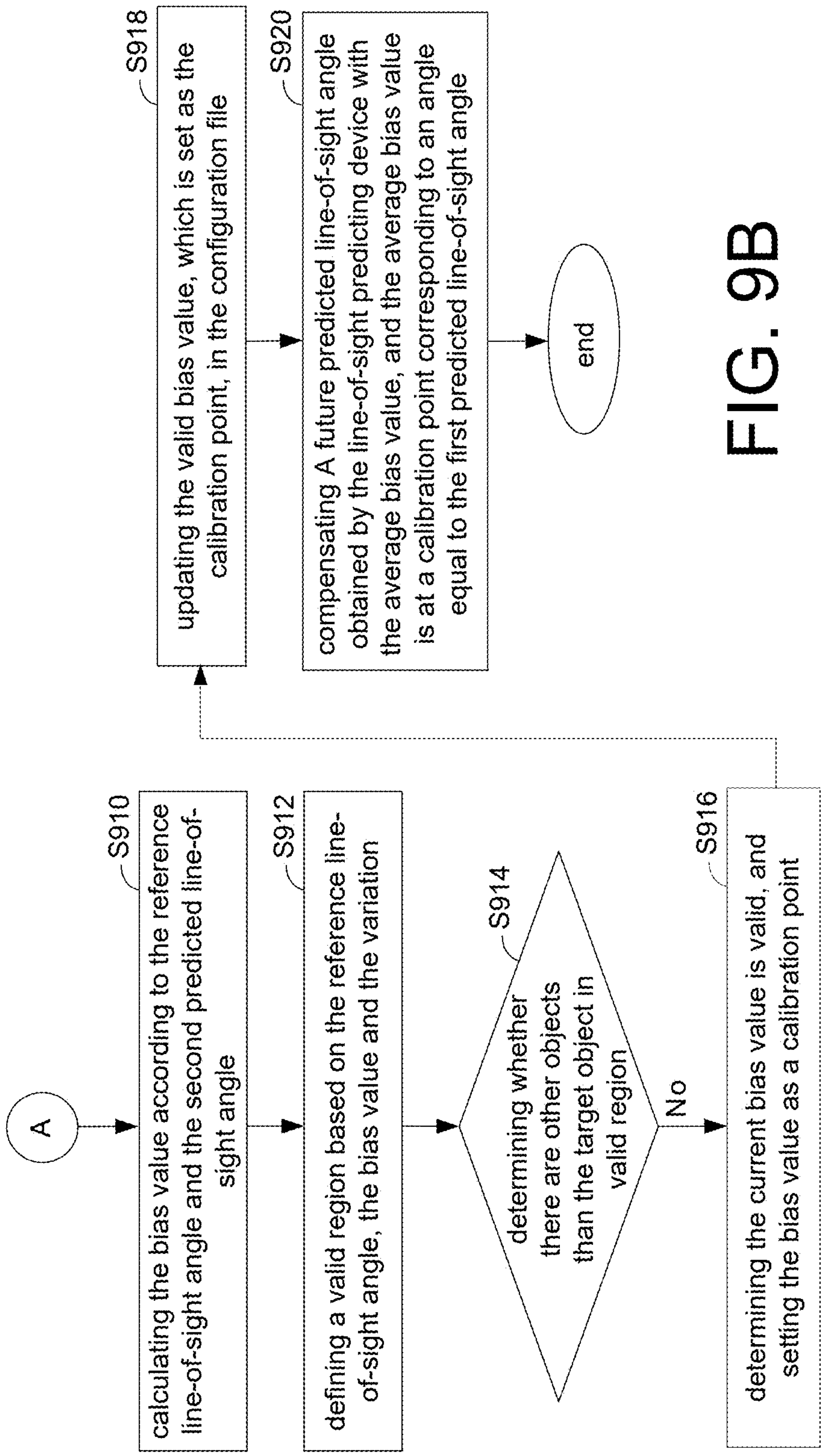

FIGS. 9A and 9B are flow diagrams of a calibrating method according to an embodiment of the present disclosure. The calibrating method of this embodiment is implemented by, for example, the calibrating system 1000 of FIG. 3. Please refer to FIG. 9A, firstly, step S900 is executed: the reference result calculating device 100 receives the first image M1 including the eye (e.g., left eye 11) of the user 10 generated by the image capturing device 21, and receives the target position p1 generated by the sensing system 22.

Next, step S902 is executed: the eye position calculating unit 101 analyzes the first image M1 of the eye to obtain the eye position e1.

Next, step S904 is executed: the space converting unit 103 calculates the reference line-of-sight angle $A_{REF}$ according to the eye position e1 and the target position p1.

Next, step S906 is executed: the line-of-sight predicting device 40 performs a coarse prediction based on the first image M1, so as to obtain several ones of the first line-of-sight predicted results PD1, which include several ones of the first predicted line-of-sight angle $A_{PD1}$.

Next, step S908 is executed: the filtering processing device 200 performs filtering processing on several ones of the first line-of-sight predicted result PD1, so as to obtain the second line-of-sight predicted result PD2. The second line-of-sight predicted result PD2 includes a second predicted line-of-sight angle $A_{PD2}$. The filtering process performs, for example, a statistical processing on several ones of the first predicted line-of-sight angle $A_{PD1}$, so as to calculate an average value $E\_A_{PD1}$ and a variation $V\_A_{PD1}$ of the first predicted line-of-sight angles $A_{PD1}$. Then, the average value $E\_A_{PD1}$ is taken as the second predicted line-of-sight angle $A_{PD2}$.

Next, please refer to FIG. 9B, step S910 is executed: the compensation value calculating device 300 calculates the bias value B according to the reference line-of-sight angle $A_{REF}$ and the second predicted line-of-sight angle $A_{PD2}$.

Next, step S912 is executed: a valid region R1 is defined based on the reference line-of-sight angle $A_{REF}$, the bias value B and the variation $V\_A_{PD1}$.

Next, step S914 is executed: it is determined whether there are other target objects than the target object 30 in valid region R1. If the determination result is "No" (i.e., there is only a single target object 30 in the valid region R1), step S916 is executed: it is determined whether the current bias value B is valid, and the valid bias value B is set as a calibration point.

Next, step S918 is executed: the configuration managing device 400 updates the bias value B, which is valid and set as the calibration point, in the configuration file.

Next, step S920 is executed: the line-of-sight calibrating device 500 calculates the average bias value B' according to the calibration point corresponding to the first predicted line-of-sight angle $A_{PD1}$, and compensates the first predicted line-of-sight angle $A_{PD1}$ currently predicted by the line-of-sight predicting device 40 with the average bias value B'.

It will be apparent to those skilled in the art that various modifications and variations can be made to the disclosed embodiments. It is intended that the specification and examples be considered as exemplars only, with a true scope of the disclosure being indicated by the following claims and their equivalents.

What is claimed is:

1. A calibrating system, comprising:

a reference result calculating device, for generating an eye position of an eye of a user at each of a plurality of historical time points, and obtaining a reference line-of-sight angle according to the eye position and a target position associated with a target object at each of the historical time points, wherein the eye is a left eye or a right eye of the user, the user is located inside a vehicle, and the target object is located outside the vehicle;

a filtering processing device, for performing a filtering process on a plurality of first predicted line-of-sight angles generated by a line-of-sight predicting device at the historical time points, so as to obtain a second predicted line-of-sight angle at each of the historical time points, wherein the first predicted line-of-sight angles are obtained by the line-of-sight predicting device through a coarse prediction based on a plurality of first images associated with the eye;

a compensation value calculating device, for obtaining a plurality of offset values according to the second predicted line-of-sight angles and the reference line-of-sight angles at the historical time points;

a configuration managing device, for updating the second predicted line-of-sight angles and the offset values at the historical time points in a configuration file; and a line-of-sight calibrating device, for calculating an average offset value of the second predicted line-of-sight angles according to the configuration file, and compensating a future predicted line-of-sight angle according to the average offset value.

2. The calibrating system of claim 1, wherein the first images associated with the eye are generated by an image capturing device disposed inside the vehicle.

3. The calibrating system of claim 2, wherein the reference result calculating device comprising:

an eye position calculating unit, for analyzing the first images associated with the eye to obtain the eye position; and a space converting unit, for calculating the reference line-of-sight angle according to the eye position and the target position.

4. The calibrating system of claim 1, wherein the filtering processing device performs the filtering process to obtain an average value and a variation of the first predicted line-of-sight angles, and the second predicted line-of-sight angle is equal to the average value.

5. The calibrating system of claim 4, wherein the compensation value calculating device defines a valid region based on the reference line-of-sight angle, the offset value and the variation, and determines whether there are other objects than the target object in the valid region.

6. The calibrating system of claim 5, wherein the valid region has a reference center and a span value, the reference center corresponds to the reference line-of-sight angle, and the span value is equal to a summing result for the offset value summed up with a product of the variation and a factor.

7. The calibrating system of claim 5, wherein when only the target object exists in the valid region, the compensation value calculating device determines that the second predicted line-of-sight angle and the corresponding offset value are valid.

8. The calibrating system of claim 7, wherein the configuration managing device updates the offset value, which is determined as valid, in the configuration file.

9. The calibrating system of claim 8, wherein the compensation value calculating device establishes a calibration point based on the first predicted line-of-sight angle associated with the offset value.

10. The calibrating system of claim 9, wherein the line-of-sight calibrating device compensates the future predicted line-of-sight angle with the average offset value at the calibration point corresponding to an angle equal to the future predicted line-of-sight angle.

11. A calibrating method, comprising the following steps:

generating an eye position of an eye of a user at each of a plurality of historical time points, and obtaining a reference line-of-sight angle according to the eye position and a target position associated with a target object at each of the historical time points, wherein the eye is a left eye or a right eye of the user, the user is located inside a vehicle, and the target object is located outside the vehicle, by a reference result calculating device;

performing a filtering process on a plurality of first predicted line-of-sight angles generated by a line-of-sight predicting device at the historical time points, so as to obtain a second predicted line-of-sight angle at each of the historical time points, wherein the first predicted line-of-sight angles are obtained by the line-of-sight predicting device through a coarse prediction based on a plurality of first images associated with the eye, by a filtering processing device;

obtaining a plurality of offset values according to the second predicted line-of-sight angles and the reference line-of-sight angles at the historical time points, by a compensation value calculating device;

updating the second predicted line-of-sight angles and the offset values at the historical time points in a configuration file, by a configuration managing device; and calculating an average offset value of the second predicted line-of-sight angles according to the configuration file, and compensating a future predicted line-of-sight angle according to the average offset value, by a line-of-sight calibrating device.

12. The calibrating method of claim 11, wherein the first images associated with the eye are generated by an image capturing device disposed inside the vehicle.

13. The calibrating method of claim 12, wherein the step of generating the eye position and the target position by the reference result calculating device comprising:

analyzing the first images associated with the eye to obtain the eye position, by an eye position calculating unit of the reference result calculating device; and calculating the reference line-of-sight angle according to the eye position and the target position, by a space converting unit of the reference result calculating device.

14. The calibrating method of claim 11, wherein the step of performing the filtering process by the filtering process device comprising:

calculating an average value and a variation of the first predicted line-of-sight angles, by the filtering processing device, where the second predicted line-of-sight angle is equal to the average value.

15. The calibrating method of claim 14, further comprising:

defining a valid region based on the reference line-of-sight angle, the offset value and the variation, and determining whether there are other objects than the target object in the valid region, by the compensation value calculating device.

16. The calibrating method of claim 15, wherein the valid region has a reference center and a span value, the reference center corresponds to the reference line-of-sight angle, and the span value is equal to a summing result for the offset value summed up with a product of the variation and a factor.

17. The calibrating method of claim 15, wherein when only the target object exists in the valid region, determining that the second predicted line-of-sight angle and the corresponding offset value are valid.

18. The calibrating method of claim 17, further comprising:

updating the offset value, which is determined as valid, in the configuration file by the configuration managing device.

19. The calibrating method of claim 18, further comprising:

establishing a calibration point based on the first predicted line-of-sight angle associated with the offset value, by the compensation value calculating device.

20. The calibrating method of claim 19, further comprising:

compensating the future predicted line-of-sight angle with the average offset value at the calibration point corresponding to an angle equal to the future predicted line-of-sight angle, by the line-of-sight calibrating device.

21. A non-transitory computer-readable storage medium, for storing a plurality of instructions, and when the instructions are read by a controller, a computer device or a computer, the controller, the computer device or the computer executes the calibrating method of claim 11.

* * * * *